United States Patent
Ma et al.

(10) Patent No.: US 11,323,634 B2
(45) Date of Patent: *May 3, 2022

(54) SYSTEMS, DEVICES, AND METHODS FOR IMAGE ENHANCEMENT

(71) Applicant: Snap Inc., Santa Monica, CA (US)

(72) Inventors: Chongyang Ma, Los Angeles, CA (US); Kun Duan, Los Angeles, CA (US); Xing Mei, Los Angeles, CA (US); Nan Hu, San Jose, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,289

(22) Filed: Jul. 6, 2020

(65) Prior Publication Data

US 2020/0336678 A1    Oct. 22, 2020

Related U.S. Application Data

(63) Continuation of application No. 15/691,412, filed on Aug. 30, 2017, now Pat. No. 10,742,899.

(51) Int. Cl.
*H04N 5/262* (2006.01)
*G06T 7/11* (2017.01)
(Continued)

(52) U.S. Cl.
CPC ............. *H04N 5/2621* (2013.01); *G06T 5/20* (2013.01); *G06T 7/11* (2017.01); *G06T 13/80* (2013.01);
(Continued)

(58) Field of Classification Search
CPC .. H04N 5/2621; H04N 1/6008; H04N 1/6027; G06T 7/11; G06T 5/20; G06T 13/80
See application file for complete search history.

(56) References Cited

U.S. PATENT DOCUMENTS 6,504,951 B1 *   1/2003   Luo .................... G06K 9/00664
                                                       382/165
9,313,375 B1     4/2016   Chakravarty
(Continued)

FOREIGN PATENT DOCUMENTS

CN      103927720 A  *  7/2014
CN      103927720 A     7/2014

OTHER PUBLICATIONS

"U.S. Appl. No. 15/691,412, Final Office Action dated Oct. 17, 2019".
(Continued)

*Primary Examiner* — Abdelaaziz Tissire
*Assistant Examiner* — Zhenzhen Wu
(74) *Attorney, Agent, or Firm* — Schwegman Lundberg & Woessner, P.A.

(57) ABSTRACT

Disclosed are systems, methods, and computer-readable storage media to enhance an image on a mobile computing device. In some aspects, a user interface on the mobile computing device provides a plurality of image filters, each of the image filters associated with a different replacement sky type. Upon application of one of the plurality of image filters to an image, the mobile computing device is configured to identify a sky portion of the image, modify a color mapping of a non-sky portion of the image, and replace the sky portion of the image with replacement sky data corresponding to the applied image filter.

20 Claims, 17 Drawing Sheets

(51) Int. Cl.
*H04N 1/60* (2006.01)
*G06T 5/20* (2006.01)
*G06T 13/80* (2011.01)

(52) U.S. Cl.
CPC ......... *H04N 1/6008* (2013.01); *H04N 1/6027* (2013.01)

(56) References Cited

U.S. PATENT DOCUMENTS

| | | | |
|---|---|---|---|
| 9,430,715 | B1 | 8/2016 | Wang |
| 2002/0135787 | A1* | 9/2002 | Smith ................. H04N 1/6011 358/1.1 |
| 2004/0165788 | A1 | 8/2004 | Perez et al. |
| 2005/0280848 | A1 | 12/2005 | Seko |
| 2011/0064301 | A1* | 3/2011 | Sun ....................... G06K 9/468 382/159 |
| 2012/0157065 | A1 | 6/2012 | Yoshikawa et al. |
| 2014/0118399 | A1 | 5/2014 | Todorovich et al. |
| 2014/0140615 | A1 | 5/2014 | Finlayson et al. |
| 2016/0006939 | A1 | 1/2016 | Suzuki |
| 2016/0275675 | A1 | 9/2016 | Nakajima |
| 2016/0366344 | A1* | 12/2016 | Pan .......................... G06T 5/20 |
| 2017/0085809 | A1 | 3/2017 | Lee et al. |
| 2017/0236287 | A1 | 8/2017 | Shen et al. |
| 2017/0294000 | A1 | 10/2017 | Shen et al. |
| 2018/0350030 | A1 | 12/2018 | Simons et al. |
| 2020/0134834 | A1* | 4/2020 | Pao ......................... G06T 11/60 |
| 2021/0150682 | A1* | 5/2021 | Sytnik ...................... G06T 5/50 |

OTHER PUBLICATIONS

"U.S. Appl. No. 15/691,412, Non Final Office Action dated Jan. 2, 2020", 15 pgs.
"U.S. Appl. No. 15/691,412, Non Final Office Action dated Apr. 2, 2019", 13 pgs.
"U.S. Appl. No. 15/691,412, Notice of Allowance dated Apr. 6, 2020", 11 pgs.
"U.S. Appl. No. 15/691,412, Response filed Mar. 24, 2020 to Non Final Office Action dated Jan. 2, 2020", 10 pgs.
"U.S. Appl. No. 15/691,412, Response filed Dec. 16, 2019 to Final Office Action dated Oct. 17, 2019", 11 pgs.
"U.S. Appl. No. 15/691,412, Response filed Jun. 21, 2019 to Non-Final Office Action dated Apr. 2, 2019", 10 pgs.
Hamel, Jim, "How to Use LAB Color in Photoshop to Add Punch to Your Images", [Online], Retrieved from the Internet:<[:https://digital-photography-school.com/how-to-use-lab-color-in-photoshop-to-add-punch-to-your-images>, (accessed Aug. 24, 2017), 38 pgs.
He, Kaiming, "Guided Image Filtering", Microsoft Research, (accessed Aug. 24, 2017), 2 pgs.
James, Owen, "How to Use Curves in Photoshop", photoshop tutorial, (Mar. 9, 2010), 28 pgs.

* cited by examiner

SYSTEMS, DEVICES, AND METHODS FOR IMAGE ENHANCEMENT

CLAIM OF PRIORITY

This application is a continuation of U.S. patent application Ser. No. 15/691,412, filed on Aug. 30, 2017, which is incorporated herein by reference in its entirety.

TECHNICAL FIELD

The present disclosure generally relates to the technical field of digital image processing. Specifically, the disclosed systems, devices, and methods provide for improved representations of a sky in images and videos.

BACKGROUND

Users of social networks communicate with each other by sharing text based messages such as email or chat, as well as by sharing photos or videos. Users share photos or videos to convey many different types of messages to their friends on the social network. One common motivation for sharing photos or videos is to communicate a positive message with regards to a particular activity in which the sharing user may be engaged. Therefore, further improvements in photo and video sharing on social networks are desired.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
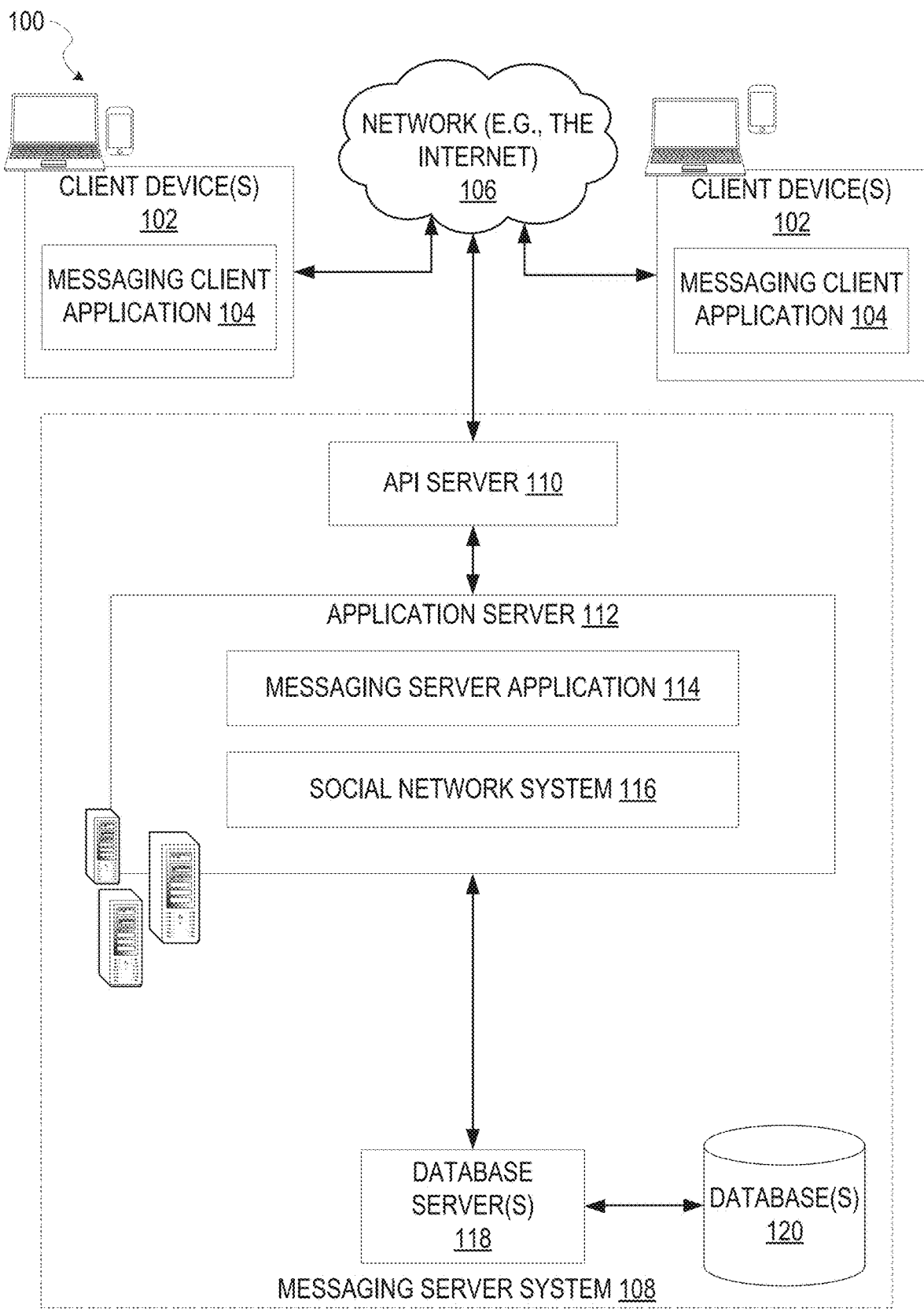
FIG. 1 is a block diagram of an exemplary messaging system.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products that provide for replacement of portions of an image including a sky. A user may be able to select a type of sky they would like to be provided in their image. For example, the user may select from for example, a daytime sky, a sunset sky, or a nighttime sky in some aspects. The image may then be modified such that the sky included in the image when the image is captured is replaced by the selected sky type.

In some aspects, a database of sky data is maintained. The sky data may provide images of different types of skies, such as the daytime sky, sunset sky, or nighttime sky referenced above. The captured image may be analyzed to identify segments of the image. For example, a first segment may be identified as including a sky portion of the image, while other segment(s) may be identified as including non-sky portions of the image. Various color adaptation processes may then be performed on the image. For example, in some aspects, the color of the image of the captured image may be improved. After the color is improved, a method of cartoonization may be applied to the image. In some aspects, color tones of the image may be further adjusted based on the type of sky selected for the image. In some of the methods, neighboring pixels of similar colors may be blended together. The sky segment of the image may then be replaced by a sky of the selected type.

In some aspects, identification of a sky portion of the image and a non-sky portion of the image may be performed by a trained classifier. For example, in some aspects, a series of training images may be provided to a model. Along with the training images, annotation data may be provided. The annotation data may identify sky portions and non-sky portions of the training images. The annotation data may be generated, in some aspects, based on human input identifying the different portions in the training images. Based on the training images, the model generates data utilized by a classifier to identify sky and non-sky portions of other images. In some aspects, the model may be a convolutional neural network. The training images and annotation data may generate filter responses. When new images are provided to the classifier, filter responses to the new images are compared with responses to the training images. By comparing the filter responses, the convolutional neural network may be able to correlate non-sky responses of the training images with non-sky responses of the new image. Similarly, filter responses to sky portions of the new image may be correlated with filter responses to sky portions of the training images.

One aspect disclosed is a wireless device. The wireless device includes a memory; and one or more electronic hardware processors coupled to the memory and configured to provide a plurality of filters in a user interface, each of the filters having an associated replacement sky type, receive input applying one of the plurality of filters to an image, determine a sky type based on the one applied filter, determine sky data based on the one applied filter, identify a sky portion of the image in response to the application of the one filter to the image, modify a color mapping of the image based on the determined sky type, and generate an enhanced image by replacing the sky portion of the image based on the sky data.

In some aspects, modifying the color mapping of the image includes cartoonizing the image. In some of these aspects, cartoonizing the image includes applying a guided filter to the image, the guided filter based on a guidance image, wherein the guidance image is a grayscale version of the image. In some aspects, the guided filter is further based on a joint bilateral filter. In some aspects, modifying the color mapping of the image further includes converting the image to a lab color space, shifting color values in A and B channels of the lab color space away from a center value in each of the A and B channels respectively. In some aspects, modifying the color mapping of the image further includes converting the image from the lab color space to an RGB color space, and applying separate color curves to each of the red, blue, and green channels of the RGB image. In some aspects of the wireless device, the one or more hardware processors are further configured to provide a nighttime sky filter, a daytime sky filter, and a sunset sky filter.

In some aspects of the wireless device, the one or more hardware processors are configured to identify the sky portion of the image by applying a trained classifier to the image. In some aspects of the wireless device, the one or more hardware processors are configured to identify the sky portion by determining a weight of each pixel of the image in the enhanced image. In some aspects of the wireless device, replacing the sky portion based on the sky data includes determining a weight for a first pixel value in a first location in the sky portion of the image, determining a second weight for a second pixel value in the sky data, the second pixel value having a location in the sky data corresponding to the first location, and multiplying the first weight by the first pixel value and the second weight by the second pixel value and adding the results to determine a pixel value for the enhanced image.

The wireless device of claim 10, wherein multiplying the first weight by the first pixel value includes looking up the multiplied value in a look up table based on the first weight and first pixel value.

Another aspect disclosed is a method of image enhancement. The method includes displaying, by an electronic hardware processor, a plurality of filters in a user interface, each of the filters having an associated replacement sky type, receiving, by the electronic hardware processor, input applying one of the plurality of filters to an image, determining, by the electronic hardware processor, a sky type based on the one applied filter, determining, by the electronic hardware processor, sky data based on the one applied filter, identifying, by the electronic hardware processor, a sky portion of the image in response to the application of the one filter to the image, modifying, by the electronic hardware processor, a color mapping of the image based on the determined sky type, and generating, by the electronic hardware processor, an enhanced image by replacing the sky portion of the image based on the sky data. In some aspects of the method, modifying the color mapping of the image includes cartoonizing the image. In some aspects of the method, cartoonizing the image comprises applying a guided filter to the image, the guided filter based on a guidance image, wherein the guidance image is a grayscale version of the image. In some aspects of the method, the guided filter is further based on a joint bilateral filter. Some aspects of the method also include identifying the sky portion of the image by applying a trained classifier to the image. Some aspects of the method also include identifying the sky portion by determining a weight of each pixel of the image in the enhanced image. In some aspects of the method, replacing the sky portion based on the sky data includes determining a weight for a first pixel value in a first location in the sky portion of the image, determining a second weight for a second pixel value in the sky data, the second pixel value having a location in the sky data corresponding to the first location, and multiplying the first weight by the first pixel value and the second weight by the second pixel value and adding the results to determine a pixel value for the enhanced image. In some aspects of the method, multiplying the first weight by the first pixel value includes looking up the multiplied value in a look up table based on the first weight and first pixel value.

Another aspect disclosed is a non-transitory computer readable medium comprising instructions that when executed cause an electronic hardware processor to perform a method of image enhancement, the method includes displaying, by an electronic hardware processor, a plurality of filters in a user interface, each of the filters having an associated replacement sky type, receiving, by the electronic hardware processor, input applying one of the plurality of filters to an image, determining, by the electronic hardware processor, a sky type based on the one applied filter, determining, by the electronic hardware processor, sky data based on the one applied filter, identifying, by the electronic hardware processor, a sky portion of the image in response to the application of the one filter to the image, modifying, by the electronic hardware processor, a color mapping of the image based on the determined sky type; and generating, by the electronic hardware processor, an enhanced image by replacing the sky portion of the image based on the sky data.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

At least some of the disclosed aspects may apply effects to images captured by imaging sensors integrated with the client device 102. For example, in some aspects, a user may be provided with a user interface that allows the use to select between multiple sky types they would like to be added to an image. In some aspects, the user interface may take the form of a user interface providing a plurality of filters, as described above. Each filter may be configured to apply a different sky type to the image or video being filtered. When a filter for a particular sky type is applied to an image, the image may be segmented into sky and non-sky portions, the color of the image may be adjusted to facilitate matching the sky type of the filter to the image, and then the sky portion of the image may be substituted with the filter's sky type. These functions are discussed in more detail below.

Figure 2:
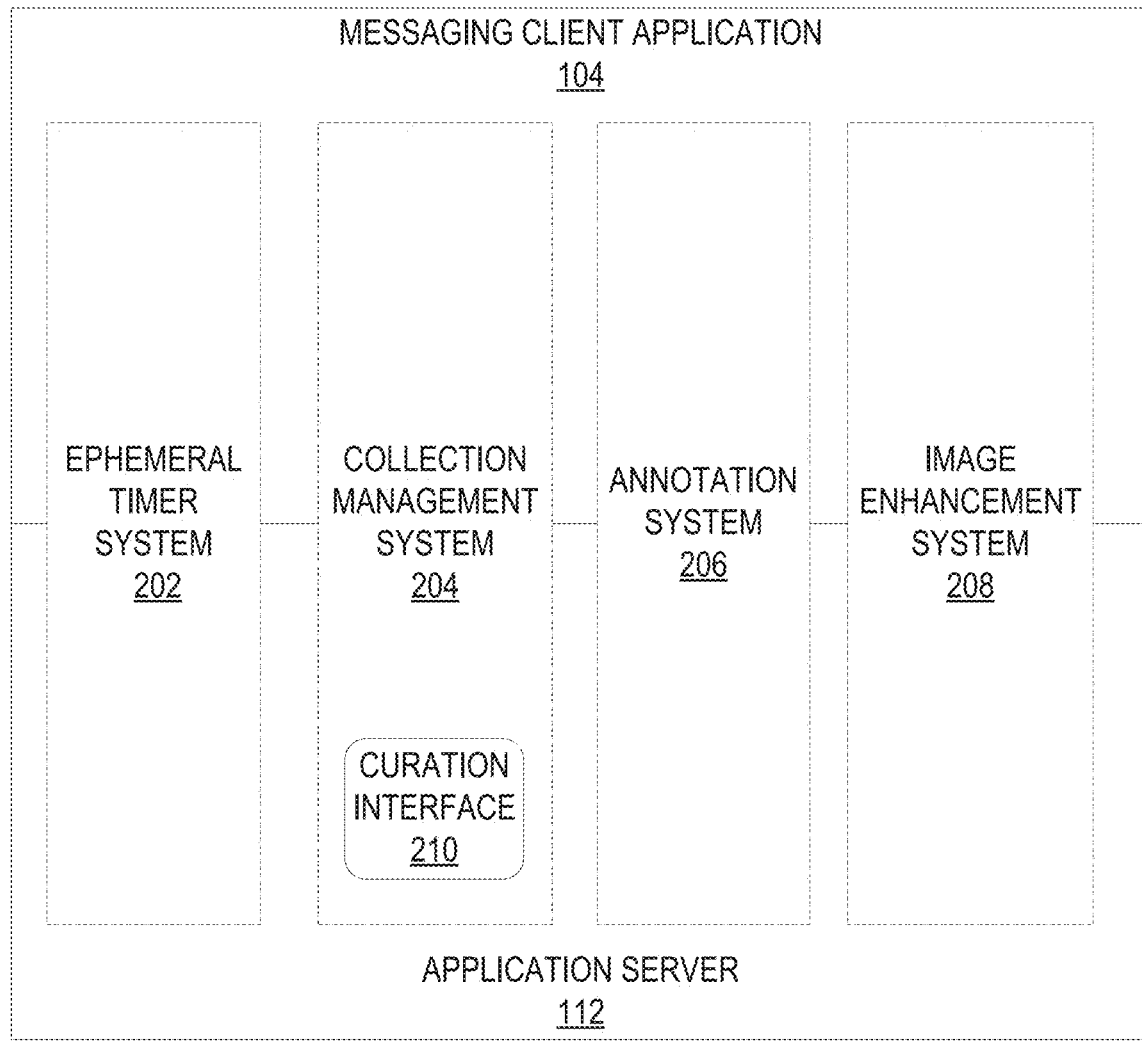
FIG. 2 is a block diagram of an exemplary embodiment of the messaging client application of the messaging system discussed with respect to FIG. 1.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and an image enhancement system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 210 that allows a collection manager to manage and curate a particular collection of content. For example, the curation interface 210 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content in a collection. In such cases, the curation interface 210 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The image enhancement system 208 provides for replacement of portions of an image or video including a sky. A user may be able to select a type of sky they would like to be provided in their image. For example, the user may select from for example, a daytime sky, a sunset sky, or a nighttime sky in some aspects. The image may then be modified such that the sky included in the image when the image is captured is replaced by the selected sky type.

In some aspects, a database of sky data is maintained by the image enhancement system 208. The sky data may provide images of different types of skies, such as the daytime sky, sunset sky, or nighttime sky referenced above. The captured image may be analyzed to identify segments of the image. For example, a first segment may be identified as including a sky portion of the image, while other segment(s) may be identified as including non-sky portions of the image. Various color adaptation processes may then be performed on the image. For example, in some aspects, the color of the image of the captured image may be improved. After the color is improved, a method of cartoonization may be applied to the image. In some aspects, color tones of the image may be further adjusted based on the type of sky selected for the image. In some of the methods, neighboring pixels of similar colors may be blended together. The sky segment of the image may then be replaced by a sky of the selected type.

Figure 3A:
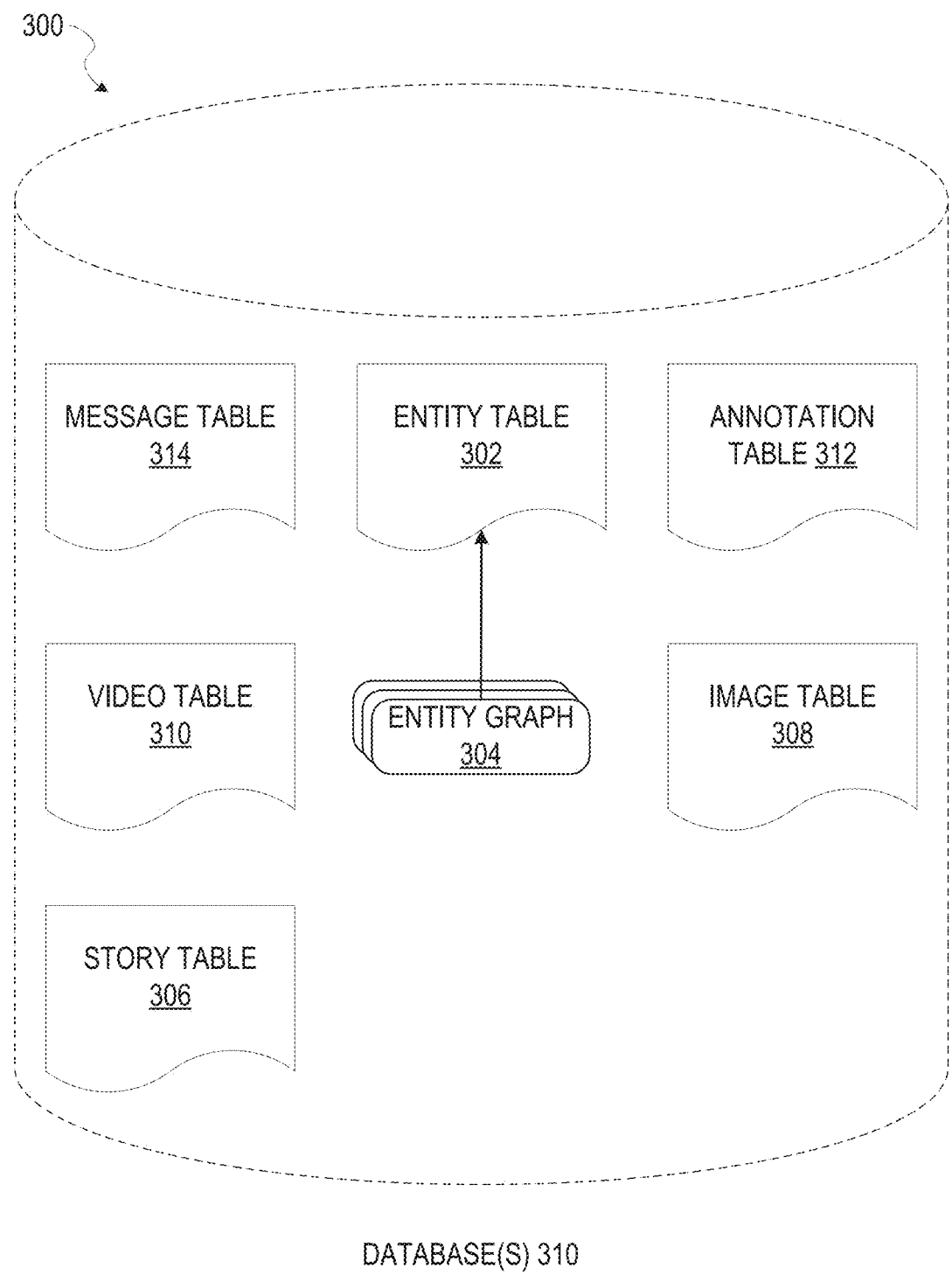
FIG. 3A is a schematic diagram illustrating an exemplary database 120 of the messaging server system.

FIG. 3A is a schematic diagram 300 illustrating an exemplary database 120 of the messaging server system 108. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time. Some filters may apply various image enhancements to images to which they are applied. For example, a set of filters may apply a corresponding set of replacement sky types to images to which they are applied. As one example, a first filter may apply a daytime sky, a second filter may apply a sunset sky, and a third filter may apply a nighttime sky in some aspects.

Other annotation data that may be stored within the image table 608 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

The disclosed methods and systems may operate on data stored or referenced by the image table 308 and/or the video table 310. For example, in some aspects, filters may be applied to an image or a video stored by the image table 308 or video table 310 to modify a portion of the image or video including sky. As discussed above, filters may selectively apply different types of sky to images to which they are applied.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3B:
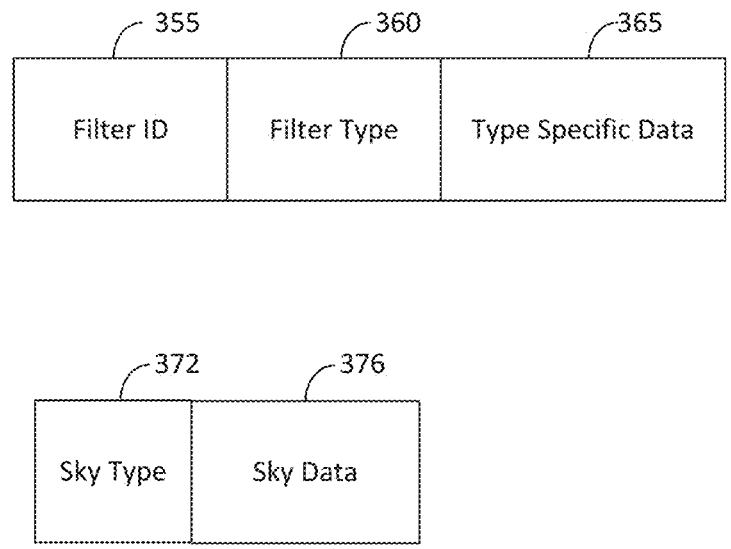
FIG. 3B shows exemplary relational database tables included in the annotation database of FIG. 3A.

FIG. 3B shows exemplary relational database tables included in the annotation database 312 of FIG. 3A. A filter table 350 may include a row for each filter defined by the system 100. Each row may include a filter identifier 355, and a filter type 360. Rows for some filters may also include a sky type 365. The filter id 355 provides a unique identifier for the filter represented by a particular row in the filter table 350. The filter type 360 defines at least a type of operation performed when the filter is applied in an image. For example, the filter type may identify whether the filter is a data filter, a geolocation filter, or a sky replacement filter, as discussed above.

The type specific data column 365 may define data for the filter that varies based on the type of filter defined in the filter type column 360. If the filter type column 360 indicates the filter is a sky replacement filter, the type specific data 365 may define a type of sky used as a replacement filter. For example, in some exemplary aspects, the type specific data 365 may indicate whether the filter is a daytime sky replacement filter, nighttime sky replacement filter, or an evening sky replacement filter.

The sky table 370 may define data to support substitution of a sky region of an image with a replacement sky. Data defining the replacement sky may be stored in the sky table 370 in some aspects. The sky table 370 includes a sky type column 372 and a sky data column 376. The sky type column 372 may align with the type specific data column 365 when the filter type indicated by the filter type column 360 is a sky replacement filter. In other words, the sky table 370 provides data defining replacement skies for the sky replacement filters. The appropriate data for different sky types can be identified by cross references the sky type stored in the type specific data 365 and the sky type column 372.

Figure 4:
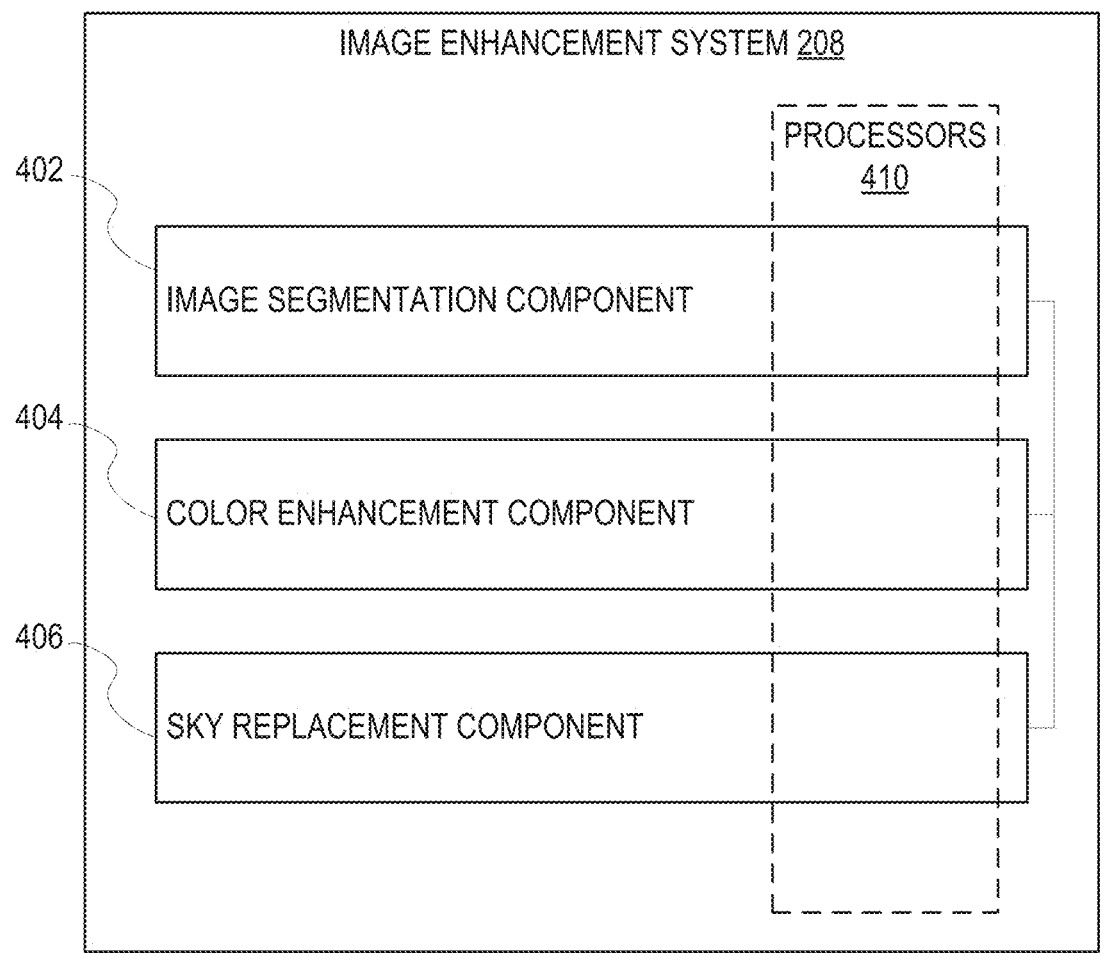
FIG. 4 is a block diagram of functional components of an exemplary image enhancement system.

FIG. 4 is a block diagram of functional components of an exemplary image enhancement system 208. As discussed above, the image enhancement system 208 forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the image enhancement system 208 to facilitate additional functionality that is not specifically described herein. As shown, the image enhancement system 208 includes an image segmentation component 402, a color enhancement component 404, and a sky replacement component 406. Each of the image segmentation component 402, color enhancement component 404, and sky replacement component 406 may store instructions that configure the processors 410 to perform one or more of the functions discussed herein with respect to image enhancement, and specifically, to replacement of a sky portion of an image.

The above referenced functional components of the image enhancement system 208 are configured to communicate with each other (e.g., via a bus, shared memory, a switch, or APIs). Collectively, these components facilitate image enhancement, and in some aspects, replacement of sky portions of an image or video for users.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the image enhancement system 208 may physically include an arrangement of one or more processors 410 (e.g., a subset of or among one or more processors of a machine) configured to perform the operations described herein for that component. As another example, any component of the image enhancement system 208 may include software, hardware, or both, that configure an arrangement of the one or more processors 410 to perform the operations described herein for that component. Accordingly, different components of the image enhancement system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components.

Figure 5:
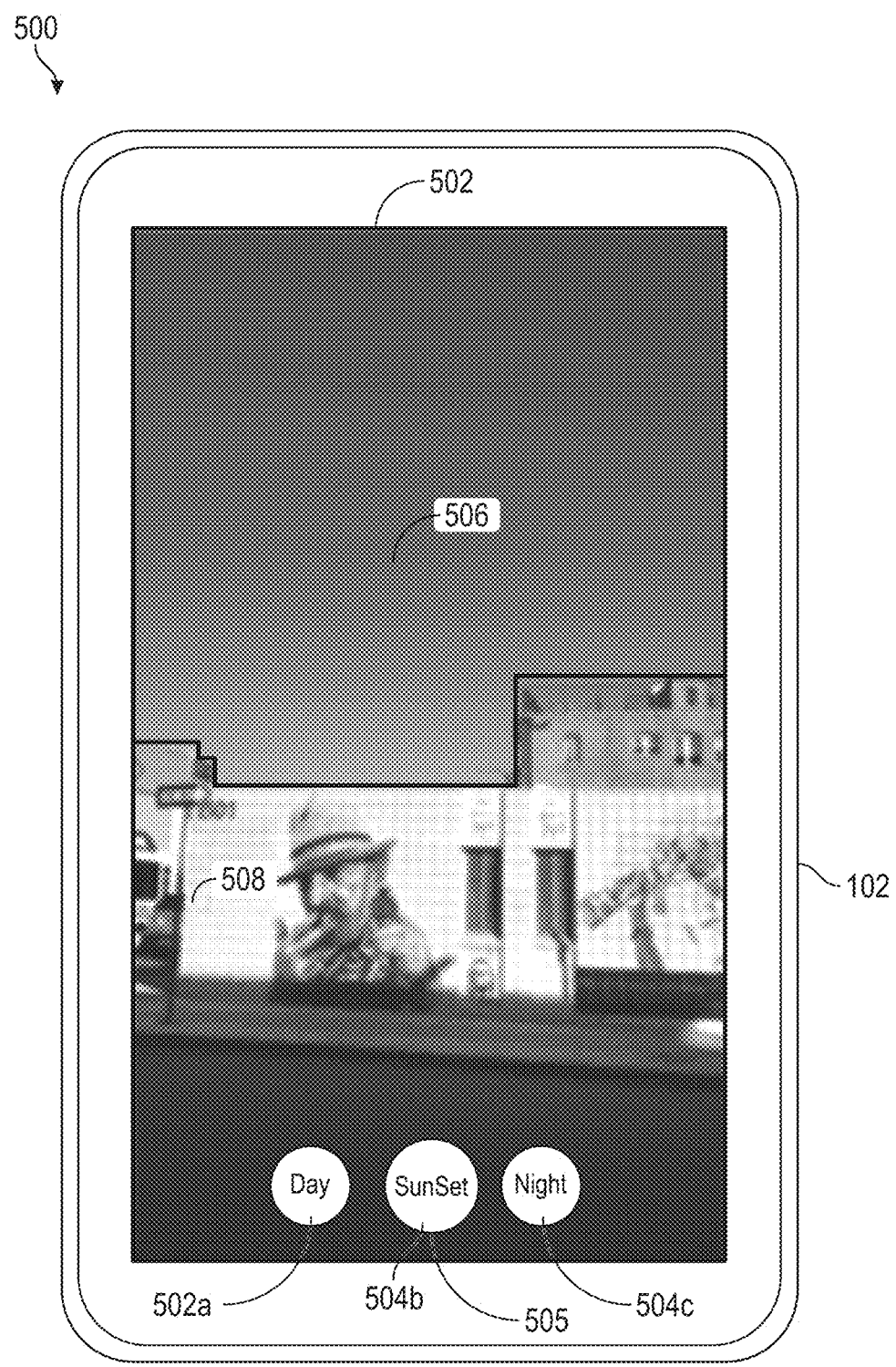
FIG. 5 is an exemplary user interface that may be provided by one or more of the disclosed embodiments.

FIG. 5 is an exemplary user interface that may be provided by one or more of the disclosed embodiments. The user interface 500 is displayed on a client device 102. The user interface 500 displays an image 502. The image 502 may be a fixed image, such as a snapshot or photograph. Alternatively, the image 502 may be a frame in a video. The user interface 500 also displays filter selection controls 504a-c. The filter selection controls 504a-c include an active filter control. The image 502 as displayed in the user interface 500 reflects modifications as applied by the active filter control. In the illustrated aspect, the active filter control is filter control 504b, which is at a center position 505 of the selectable filter controls 504a-c. The filter control located at the center position 505 is shown as slightly larger than the other filter controls 504a and 504c, with the relative size of the filter control 504b indicating its active status relative to filter controls 504a and 504c.

The image 502 shown in the user interface 500 may be considered to have two portions. A first portion of the image 502 is a sky portion 506 of the image 502, while a second portion is a non-sky portion 508 of the image. Application of any of the filters controls 504a-c to the image 502 may cause a replacement of a sky portion 506 of the image 502. In some aspects, the sky portion 506 may be replaced by data derived from the sky data 376, discussed above with respect to FIG. 3B.

Figure 6:
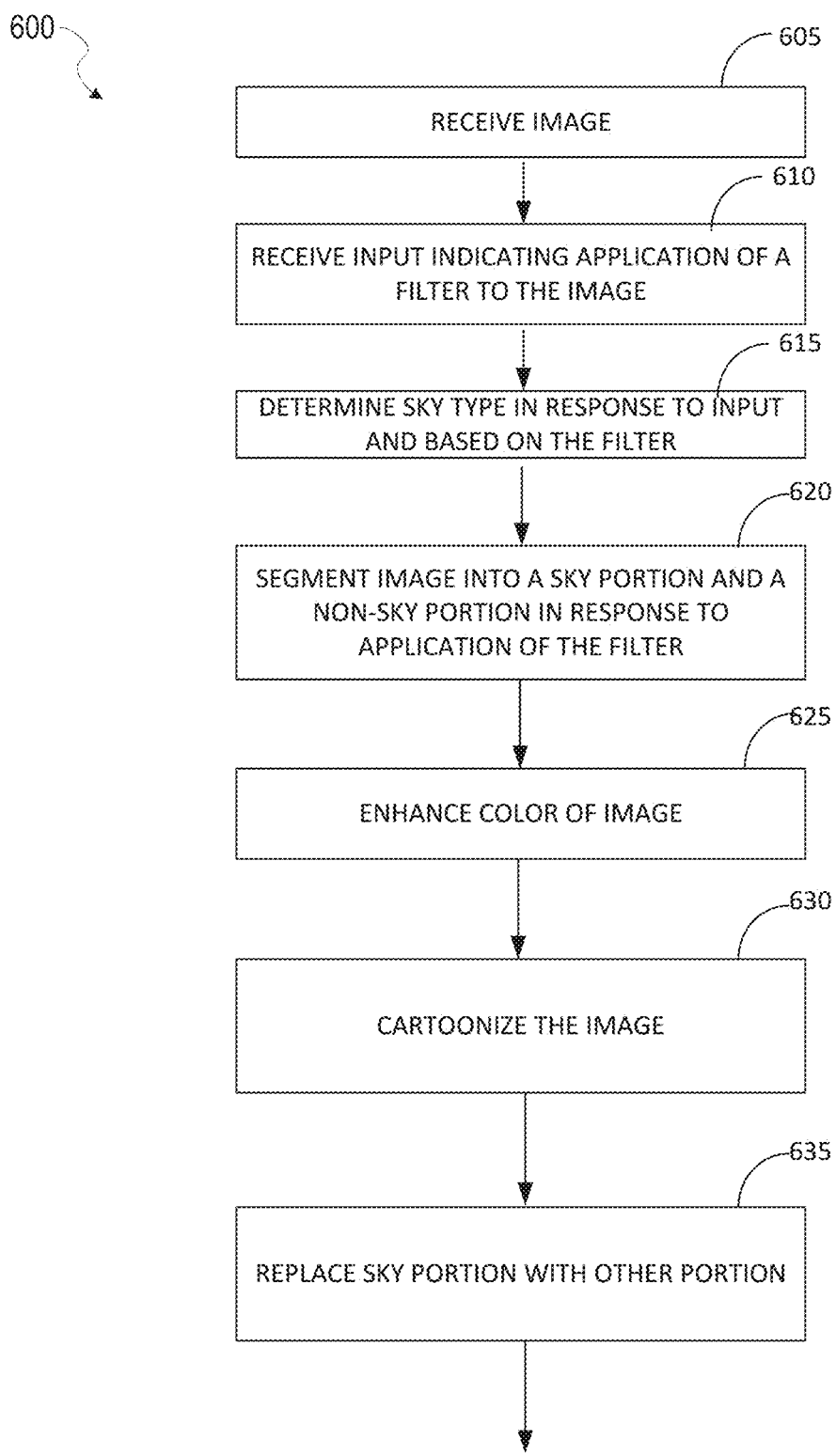
FIG. 6 is a flowchart of an exemplary method of image enhancement.

FIG. 6 is a flowchart of an exemplary method of image enhancement. In some aspects, one or more of the functions discussed below with respect to FIG. 5 may be performed by a hardware processor. For example, in some aspects, instructions stored in one or more of the image segmentation component 402, color enhancement component 404, sky replacement component 406 may configure a processor, such as one or more processors 410, to perform the functions discussed below.

In block 605, an image is received. In some aspects, the image may be a frame of a video. In some aspects, the image may be received by the processor(s) 410.

In block 610, input is received indicating application of a filter to the image. For example, in some aspects, a user may, via touch screen inputs on the client device 102, indicating that a filter is to be applied to the image. As discussed above, messaging system 100 may provide a plurality of filters for modification of an image sky. Each filter may apply a different type of sky to an image to which it is applied in some aspects. Thus, block 610 may receive input indicating a type of filter applied to the image. In the user interface 600 illustrated in FIG. 6 and discussed above, block 610 may be performed in response to a user sliding the filters 604a-c such that one of the filters 604a-c becomes the active filter, occupying the position of filter 604b in FIG. 6.

In block 615, a sky type is determined in response to the input and based on the filter. As discussed above, the particular filter applied to an image may define a type of sky to be substituted for an existing sky portion of the image. Thus, block 615 may derive a sky type from the particular filter applied to the image, as indicated by the input received in block 610. In the example user interface 600 of FIG. 6, a sky time of day sky may be determined if filter 602a is the active or center filter.

In block 620, the image is segmented into a sky portion and a non-sky portion. In some aspects, a sky portion of the image may be identified via thresholds methods, such as Otsu's method. Other aspects may utilize Mean Shift, Graph cut, and HMRF-EM image segmentation algorithms. In some aspects, k-means clustering techniques may be further applied when segmentation algorithms provide more than two categories for regions of an image (i.e. more than sky and non-sky). The k-means clustering may reduce the more than two categories of regions to two categories (sky and non-sky regions).

In some aspects, the sky segmentation may include a rough segmentation and a refined segmentation. In some aspects, the rough segmentation may utilize a neural network based approach. In some aspects, a segmentation model may be trained offline based on a set of training images. Each training image includes annotations defining a proper segmentation of the image. These annotations may be manually applied in some aspects. After the model is trained, the model may be applied to the image to identify a sky region and other regions within the image.

Figure 7C:
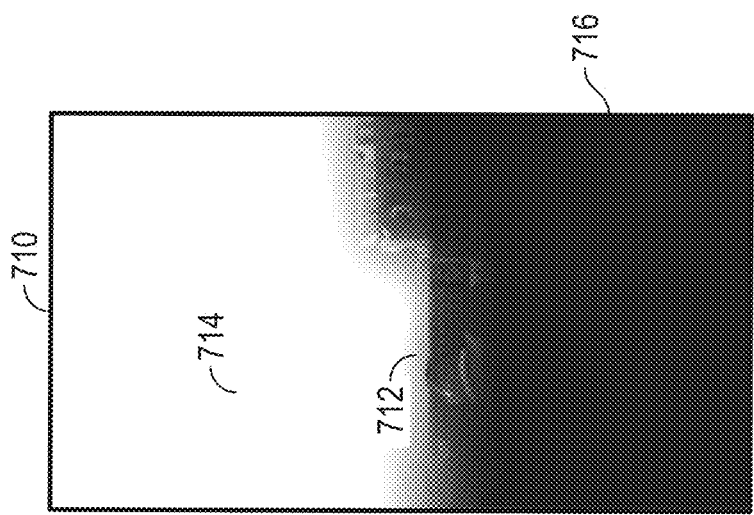
FIG. 7C shows an exemplary segmentation of an image after a refined image segmentation process according to at least some of the disclosed embodiments.
Figure 7B:
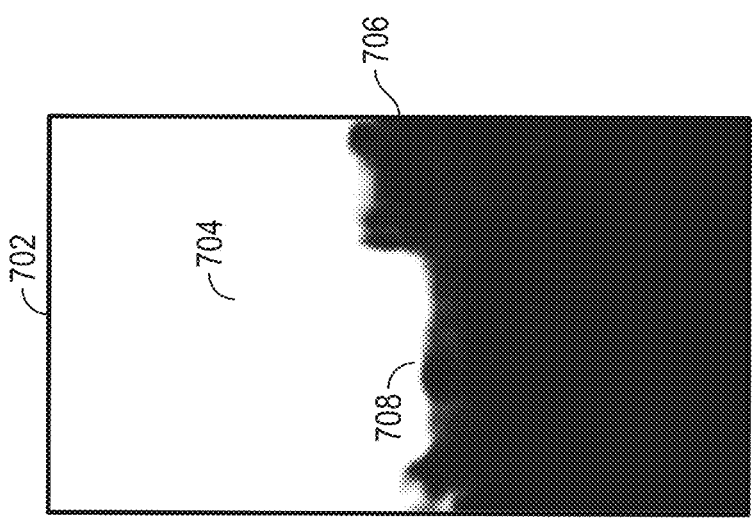
FIG. 7B shows an exemplary segmentation of the image after a rough segmentation process according to at least some of the disclosed embodiments.
Figure 7A:
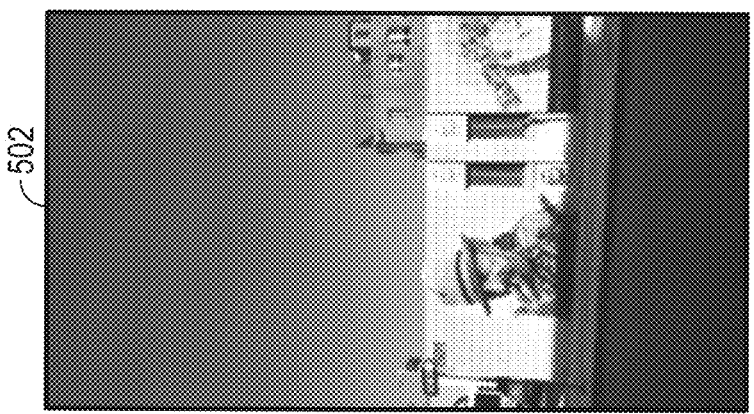
FIG. 7A shows an exemplary image that may be segmented by the disclosed embodiments.

User interface 500 shows an example of a sky portion 506. of an image 502 and a non-sky portion 508. Another example of segmentation is shown in FIGS. 7A-C below. FIG. 7A shows an exemplary image 502 that may be segmented by the disclosed embodiments. FIG. 7B shows an exemplary segmentation of the image 502 after the rough segmentation process discussed above. FIG. 7B shows the image 502 has been segmented into image 702 having two portions 704 and 706. Note that the boundary 708 between the two portions 704 and 706 may have some ambiguity or lack of precision. FIG. 7C shows the image 502 after the refined segmentation process is further applied to the segmented image 702, the resulting segmented image 710 is produced. Note that segmented image 710 include more precise demarcation along the boundary 712 of a sky portion 714 and a non-sky portion 716 of the segmented image 710. This more precise demarcation is the result of the refined segmentation process.

Returning to the discussion of FIG. 6, in some aspects, the refined segmentation portion may utilize a guided filter. In some aspects, the rough segmentation may result in some ambiguity between a border between sky and non-sky regions of the image. The refined segmentation may reduce this ambiguity. The refined segmentation may be based in some aspects, on an unmodified version of the image as received in block 605. The refined segmentation may utilize this unmodified image as a reference.

In block 625, color of the image may be enhanced. In some aspects, color enhancement may include color enhancement in a lab color space. For example, in some aspects, block 625 may include converting the image received in block 605 to the lab color space. In some aspects, the A and B channels of the lab color space for the image may be shifted away from the center of the A and B channels respectively. A center of the A and a second center of the B channel may represent a gray color. By shifting colors in the A and B channel aware from the respective channel centers, the colors may become more vivid. In some aspects, the color data in the A and B channels may be shifted away from the center by a factor of 1.8. In other words, a distance between a pixel's color after the color enhancement may be 1.8 times further from a center of the channel than before the change. Other embodiments may utilize a different factor.

In block 630, a cartoonization effect may be applied to the image. In some aspects, this may be accomplished by application of a guided filter. In some aspects, a guided filter is a linear translation-variant filtering process, which utilizes a guidance image I, an input image p, and an output image q. Both I and p are provided. In some aspects, the guidance image I may be a grayscale version of the input image p. In other aspects, other guidance images may be utilized. The filtering output at a pixel i may be expressed as a weighted average, as shown in Equation (1) below:

$$Q_i = \Sigma W_{ij}(I) p_j \quad (1)$$

where:
i and j are pixel indexes.

The filter kernel Wij may be a function of the guidance image I and independent of p. In some aspects, neighboring pixels of similar colors may be blended together. An example filter, is a joint bilateral filter. The bilateral filtering kernel $W^{bf}$ is given by:

$$W_{ij}^{bf}(I) = \frac{1}{K_i} \exp\left(-\frac{|x_i - x_j|^2}{\sigma_s^2}\right) \exp\left(-\frac{|I_i - I_j|^2}{\sigma_r^2}\right) \quad (2)$$

where:
X is the pixel coordinate,
$K_i$ is a normalizing parameter to ensure that $\Sigma_j W_{ij}^{bf} = 1$.
The parameters $\sigma_s$ and $\sigma_r$ adjust the spatial similarity and the range (intensity/color) similarity respectively. The joint bilateral filter degrades to the original bilateral filter when I and p are identical.

In some aspects, block 630 may adjust color tones of the image. For example, in some aspects, the color tones of the image may be adjusted based on the type of sky to be included in the image. In some aspects, the type of sky to be applied to the image and the type of filter applied to the image may have a one to one correspondence, in that a user may select a type of sky to apply to the image by applying a particular filter to the image. The type of sky selected may have a first set of color tones. A second set of color tones included in the image may then be adjusted to be more compatible with the first set of color tones. In some aspects, the second set of color tones may be adjusted to match the first set of color tones.

Some aspects support three or more different target modes or styles. In some aspects, these include a daytime mode, a sunset mode, and a night mode. Block 630 may apply a curve adjustment to RBG channels of the image as follows: For daytime mode, an overall brightness of the image may be increased, and a warm color tone may be added. For a sunset mode, a yellow tone may be added to one or more regions of the image that has a brightness or luminance above a predetermined threshold. Blue tones may be added to one or more regions of the image that have a brightness or luminance below a predetermined threshold. When applying a nighttime mode, overall brightness of the image may be decreased, and a cold color tone may be added to the image. To provide for efficient operation, in some aspects, these color operations may be provided via use of a look up table.

In some aspects, three different curves may be applied to each of a red, green, and blue channel respectively. Whereas block 625 may enhance color in the lab color space, block 635 may enhance the color further using RGB format.

In block 635, a sky portion of the image identified in block 610 may be replaced with sky data from a database. For example, in some aspects, based on the type of filter applied to the image as indicated in block 610, sky data 376 may be selected from the sky database 370, based on the sky type 372.

To facilitate smooth blending of colors between the replaced sky portion and the portion of the image that is not replaced, alpha blending may be utilized in some aspects. In some aspects, alpha blending may be described using Equation 3 below:

$$C = A*M + B*(1-M) \quad (3)$$

Where:
A is a first image,
B is a second image (for example, a sky image),
C is the resulting image from blending A and B,
M is a weight matrix. M indicates a relative weight of each
pixel in A and the corresponding pixel in B when determining the resulting image C.

In some aspects, pixel values may range between zero (0) and 255. When a range of pixel values is within a reasonable upper bound, some aspects, may utilize look up tables to compute resulting pixel values instead of utilizing expensive floating point processor operations. For example, in implementations having pixel ranges of 256 values as above, all possible multiple results for any two values may be precomputed and stored in a 256×256 matrix. Using the look up table, two sets of lookup operations may be performed. First, a lookup may be performed to determine the value of Aij*Mij for a particular pixel where i and j represent coordinates for a particular pixel. Similarly, a second lookup may be performed for Bij*(1−Mij). Use of the lookup table may provide for a 5× reduction in processing requirements when compared to implementations that utilize floating point operations for these calculations.

In aspects where the image discussed above with respect to FIG. 6 is a frame in a video, process 600 may operate iteratively for each frame of the video.

Figure 8:
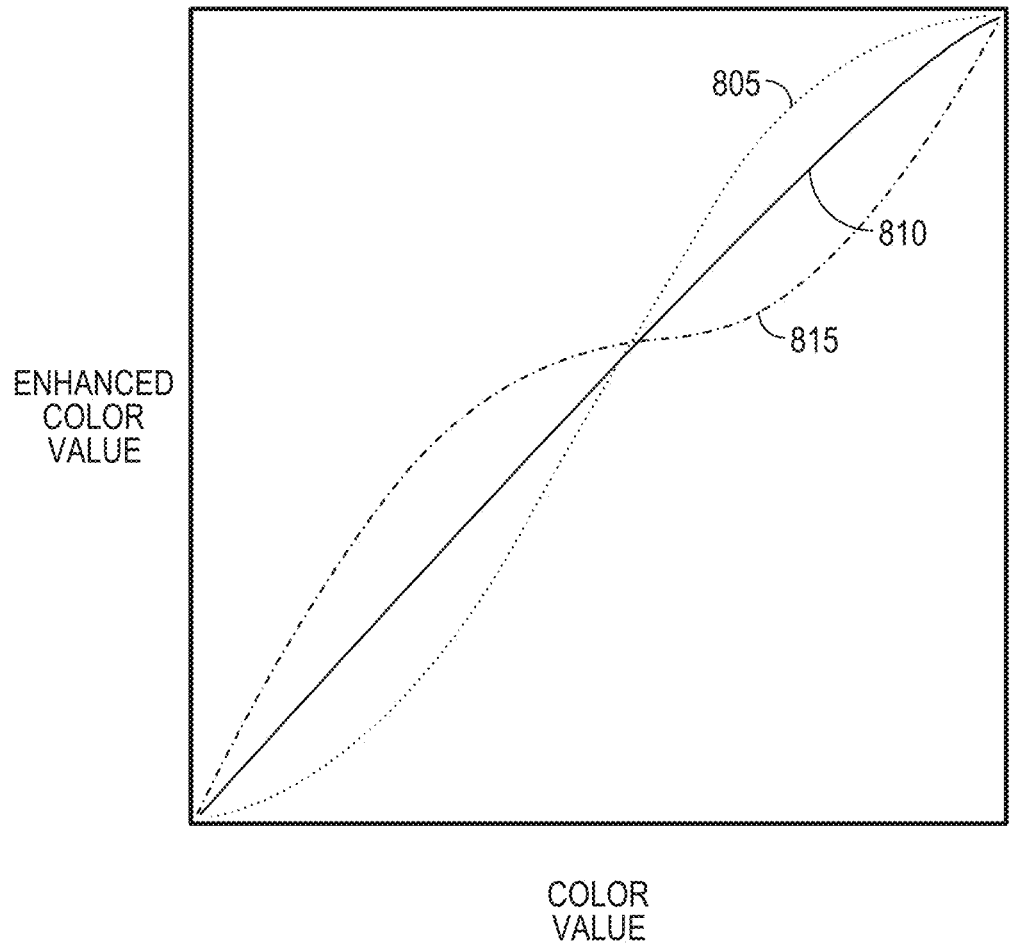
FIG. 8 shows exemplary color curves for image enhancement.

FIG. 8 shows exemplary color curves for color enhancement. The exemplary curves 800 shown in FIG. 8 may be utilized to provide color enhancement in block 630 of process 600, discussed above with respect to FIG. 6. Curve 805 may be applied to a red channel of an RGB (Red, Green, Blue) format image. Curve 810 may be applied to a green channel of the RGB format image. Curve 815 may be applied to a blue channel of the RGB format image. The exemplary color curves 800 of FIG. 8 modify an image such that if a pixel has a relatively larger value in R (red) channel, application of the curve 805 will make the pixel's red value even larger. If the pixel's red value is relatively smaller, application of the curve 805 will make the pixel's red value even smaller. Application of the curve 815 to a blue channel of the pixel is the reverse of that described above for the red channel and curve 805. Application of the curve 810 to a green channel of the pixel has a relatively smaller effect when compared to application of the curves 805 and 815 to the red and blue channels respectively. Application of the curve 810 to a green channel of a pixel may increase the value of the green channel slightly. The exemplary color curves 800 illustrated in FIG. 8 may provide for increasing both red and green values in larger-value (brighter) regions of an image. This may generally increase a yellow tone of the image. The exemplary color curves 800 also generally add more blue tone in dark regions of an image to which they are applied.

Figure 9B:
FIGS. 9A and 9B show an exemplary image color enhancement.
Figure 9A:
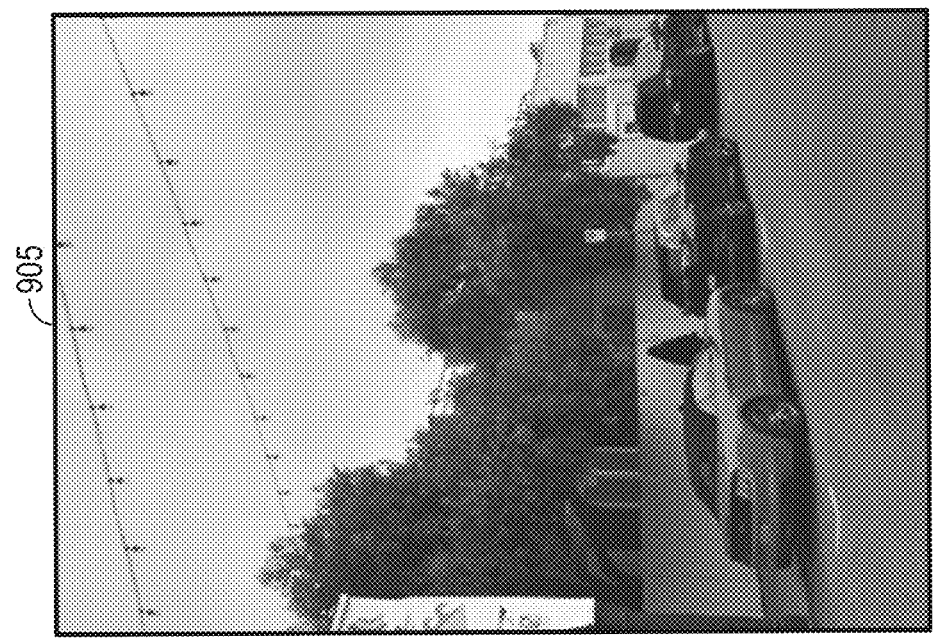

FIGS. 9A and 9B show an exemplary image color enhancement. FIG. 9A shows an input image for a color enhancement process as described above with respect to block 625 of FIG. 6. After the color enhancement of block 625 is applied to image 905, the image may appear as image 910.

Figure 10A:
FIGS. 10A and 10B show an exemplary image color enhancement.
Figure 10B:

FIGS. 10A and 10B show an exemplary image color enhancement. FIG. 10A shows an input image for a color enhancement process as described above with respect to block 625 of FIG. 6. After the color enhancement of block 625 is applied to image 1005, the image may appear as image 1010.

Figure 11:
FIGS. 11-13 shows exemplary images after replacement of a sky portion.
Figure 11:
Figure 12:
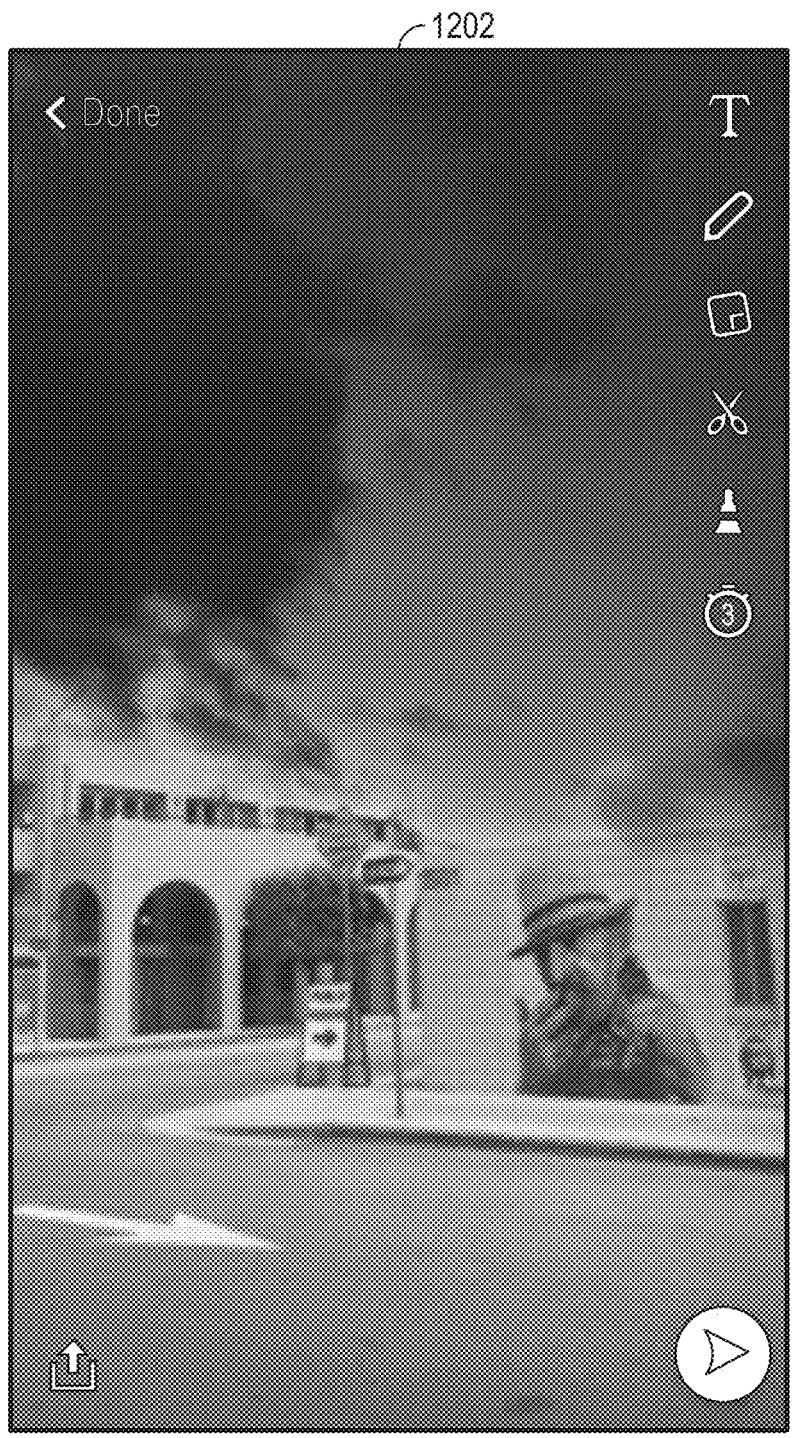
Figure 13:
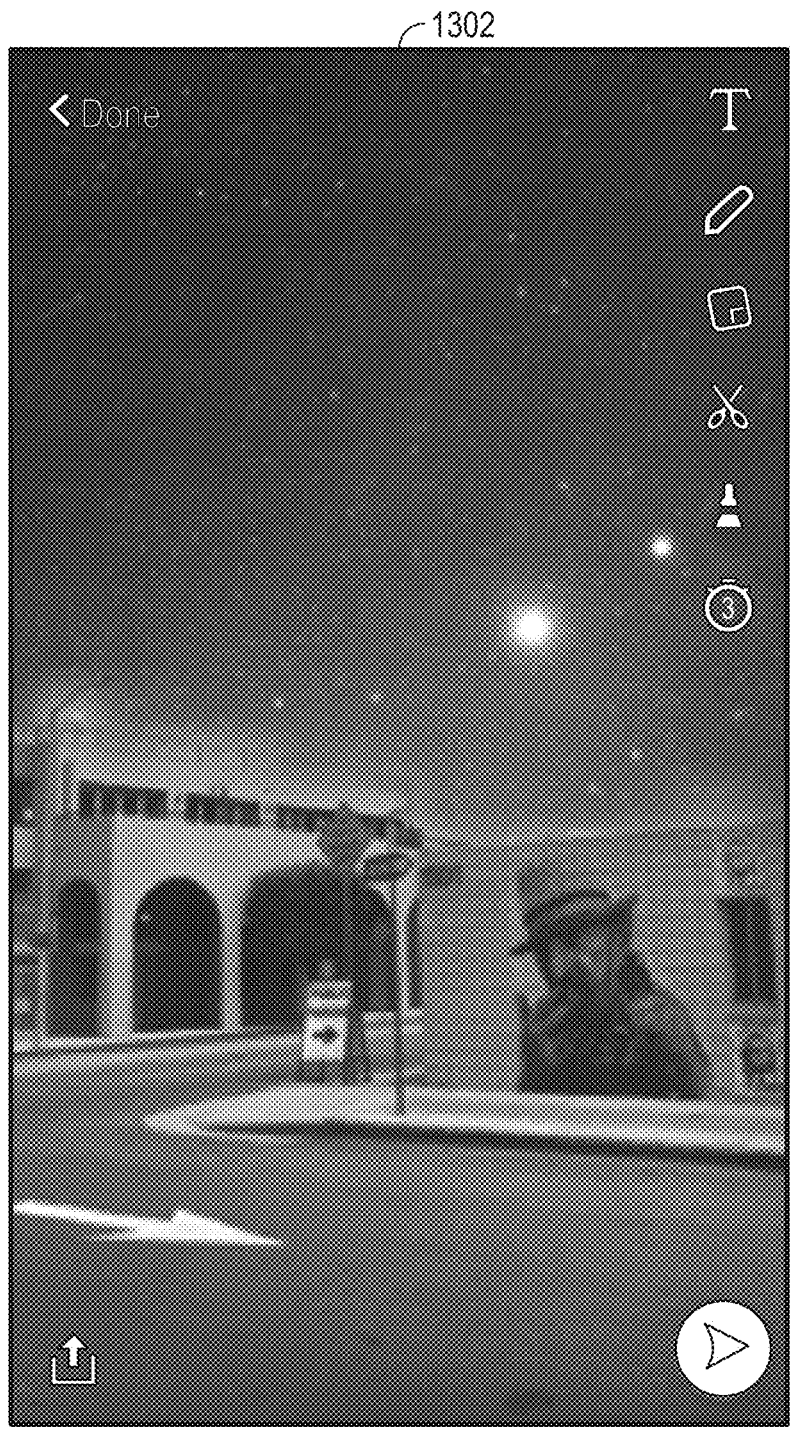

FIGS. 11-13 shows exemplary images after replacement of a sky portion. FIG. 11 shows an image 1102 before sky replacement and a modified image 1104 after a daytime sky replacement. In some aspects, the modification from image 1102 to image 1104 may be accomplished in some aspects, via selection of the daytime sky replacement filter 504a, illustrated above with respect to FIG. 5. FIG. 12 shows a modified image 1202 after replacement of the sky of image 1102 with a sunset sky. For example, in some aspects, the modified image 1202 may appear in the user interface 500 when the filter control 504b is selected or moved to the center position 505. FIG. 13 shows a modified image 1302 after replacement of the sky of image 1102 with a nighttime sky. For example, in some aspects, the modified image 1302 may appear in the user interface 500 when the filter control 504c is moved to the center position 505 or otherwise selected.

Figure 14:
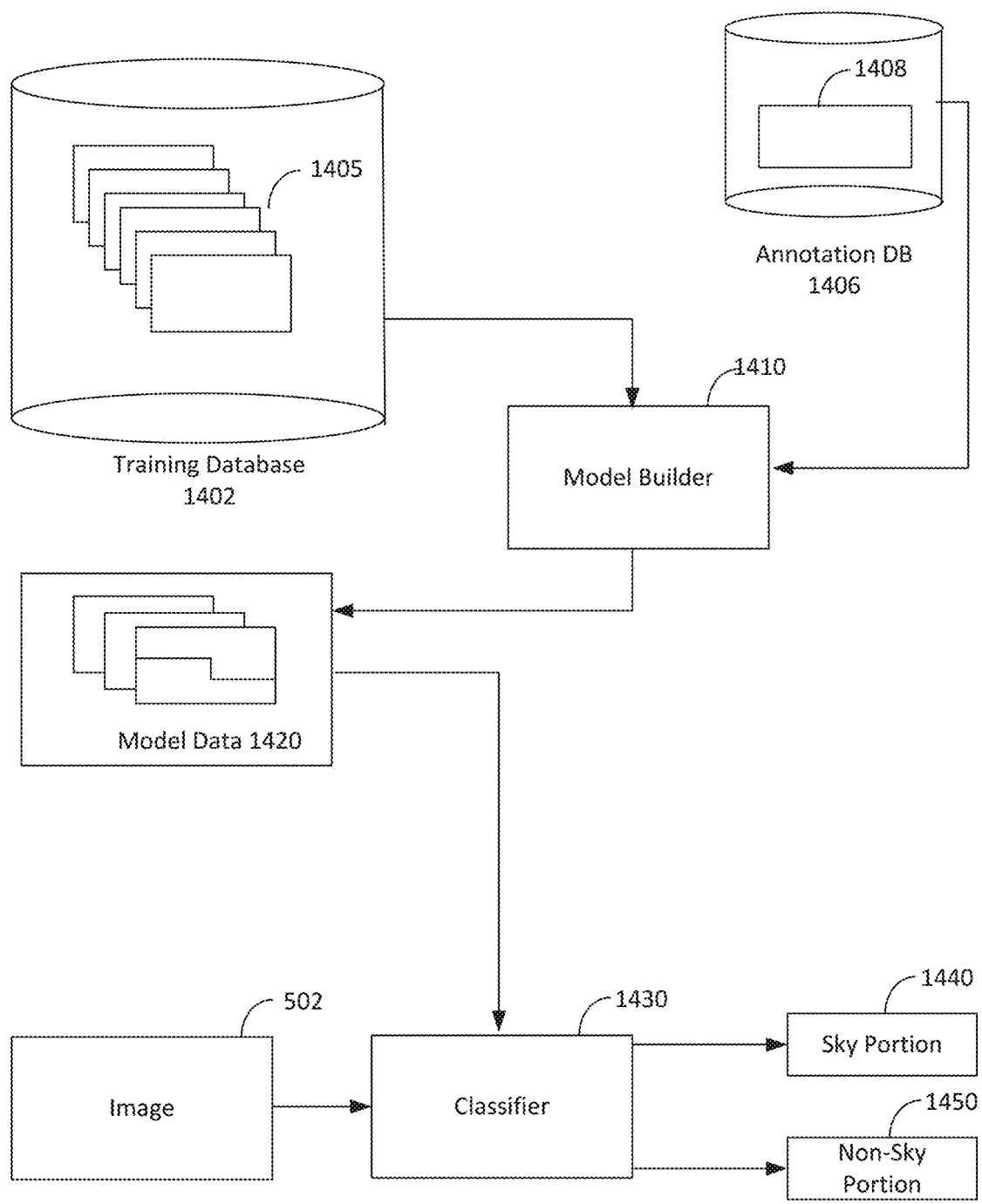
FIG. 14 is a data flow diagram of one exemplary method of training a model for sky segmentation of an image.

FIG. 14 is a data flow diagram of one exemplary method of training a model for sky segmentation of an image. FIG. 14 shows a training database 1402. The training database includes a plurality of training image 1404. Also shown is an annotation database 1406. The annotation database stores annotations 308 that indicate sky portions of images in the training database 1402. For example, the annotation database may define polygons within the training images that represent sky portions, and other polygons within the training images that represent non-sky portions. A model builder 1410 may read the training images and annotation data 1408 to generate a model database 1420. The model database may include data representing characteristics of the sky regions and non-sky regions of the images. For example, in some aspects, the model builder may employ multiple filters on the training images and generate outputs than can be utilized to determine sky and non-sky regions in other images.

A classifier 1430 may then read the model data 1420 to determine a sky region from a non-sky region in an input image 502. For example, in some aspects, the classifier 1430 may apply various filters to the input image 502, and compare filter responses to filter responses stored in the model data 1420. By identifying similarities between the filter responses from portions of sky and non-sky portions of the training images, the classifier may determine portions of sky 1440 and portions of non-sky 1450 in the input image 502. In some aspects, the data flow illustrated in FIG. 14 discussed above may be included in block 620 of FIG. 6.

Software Architecture

Figure 15:
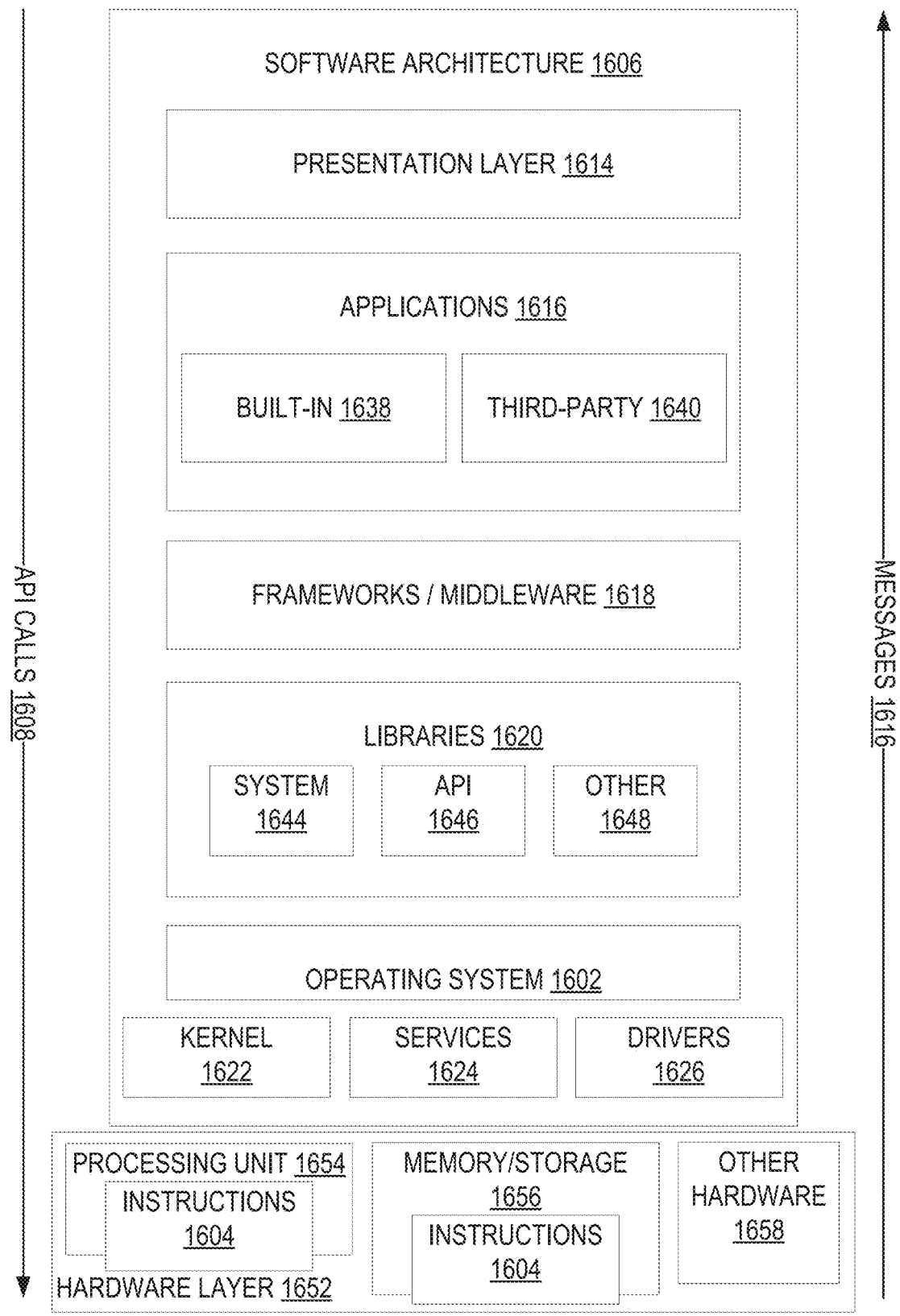
FIG. 15 is a block diagram of an exemplary software architecture.
Figure 16:
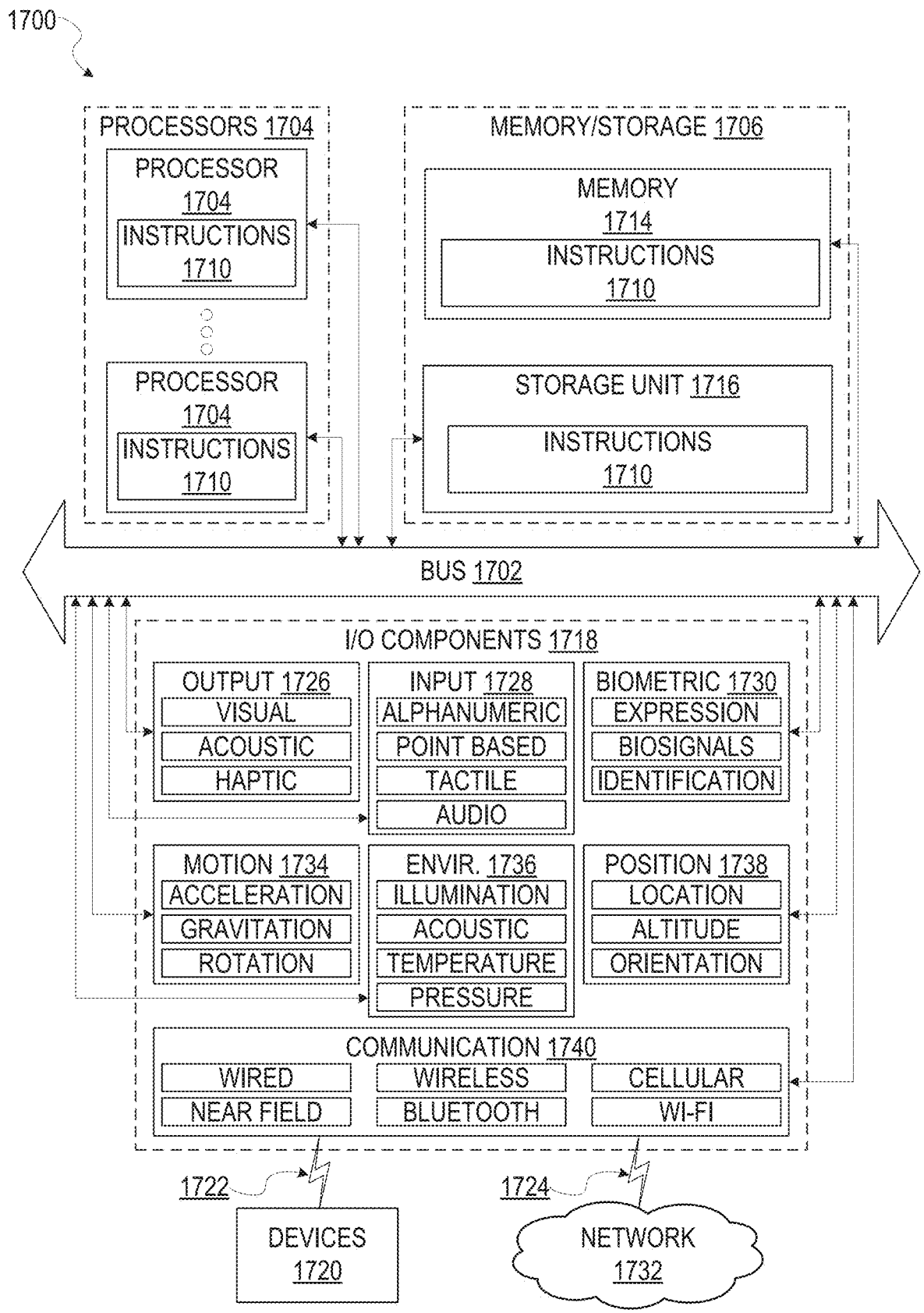
FIG. 16 is a block diagram illustrating exemplary components (also referred to herein as "modules") of a machine.

FIG. 15 is a block diagram of an exemplary software architecture 1606. The architecture 1606 may be used in conjunction with various hardware architectures herein described. FIG. 16 is a non-limiting example of a software architecture and it will be appreciated that many other architectures may be implemented to facilitate the functionality described herein. The software architecture 1606 may execute on hardware such as a machine 1700 of FIG. 17 that includes, among other things, processors 1704, memory/storage 1706, and I/O components 1718. A representative hardware layer 1652 is illustrated and can represent, for example, the machine 1700 of FIG. 17. The representative hardware layer 1652 includes a processing unit 1654 having associated executable instructions 1604. The executable instructions 1604 represent the executable instructions of the software architecture 1606, including implementation of the methods, components, and so forth described herein. The hardware layer 1652 also includes memory and/or storage 1656, which also have the executable instructions 1604. The hardware layer 1652 may also comprise other hardware 1658.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 15, the software architecture 1606 may be conceptualized as a stack of layers where each layer provides particular functionality. For example, the software architecture 1606 may include layers such as an operating system 1602, libraries 1620, frameworks/middleware 1618, applications 1616, and a presentation layer 1614. Operationally, the applications 1616 and/or other components within the layers may invoke API calls 1608 through the software stack and receive a response as messages 1610. The layers illustrated are representative in nature and not all software architectures have all layers. For example, some mobile or special-purpose operating systems may not provide a frameworks/middleware 1618 layer, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than by interfacing directly with the underlying operating system 1602 functionality (e.g., kernel 1622, services 1624, and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. The third-party applications 1640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1640 may invoke the API calls 1608 provided by the mobile operating system (such as the operating system 1602) to facilitate functionality described herein.

The applications 1616 may use built-in operating system functions (e.g., kernel 1622, services 1624, and/or drivers 1626), libraries 1620, and frameworks/middleware 1618 to create user interfaces to interact with users of the system. Alternatively, or additionally, in some systems interactions with a user may occur through a presentation layer, such as the presentation layer 1614. In these systems, the application/component "logic" can be separated from the aspects of the application/component that interact with a user.

Exemplary Machine

FIG. 16 is a block diagram illustrating exemplary components (also referred to herein as "modules") of a machine 1700. In some aspects, the machine is configured to read instructions from a machine-readable medium (e.g., a machine-readable storage medium) and perform any one or more of the methodologies discussed herein. Specifically, FIG. 16 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1200 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1704, memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of the processors 1704 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1718 may include a wide variety of components to provide a user interface for receiving input, providing output, producing output, transmitting information, exchanging information, capturing measurements, and so on. The specific I/O components 1718 that are included in the user interface of a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 11. The I/O components 1718 are grouped according to functionality merely for simplifying the following discussion and the grouping is in no way limiting. In various exemplary embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1728 may also include one or more image-capturing devices, such as a digital camera for generating digital images and/or video.

In further exemplary embodiments, the I/O components 1718 may include biometric components 1730, motion components 1734, environment components 1736, or position components 1738, as well as a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 may include acceleration sensor components (e.g., accelerometer), gravitation sensor components, rotation sensor components (e.g., gyroscope), and so forth. The environment components 1736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via a coupling 1724 and a coupling 1722 respectively. For example, the communication components 1740 may include a network interface component or other suitable device to interface with the network 1732. In further examples, the communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1740, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

In some aspects, the processors 1704 may load the input parameters 1822a-b, either directly, via memory writes via a bus, or indirectly, via an API provided by the graphics processing unit 1804. For example, in some aspects, the input parameters to process 1400 may include a selected brush type, which may define a shape of pixilation tiles, such as triangular, random shaped, hexagonal, round, square. The brush type may also define whether a pixilation region includes random colored tiles. Input parameters may also include data defining a region for pixilation, such as data defining the region 705.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAPCHAT, INC., All Rights Reserved.

We claim:

1. A device, comprising:
   a memory; and
   one or more electronic hardware processors coupled to the memory and configured to perform operations comprising:
   providing a plurality of filters in a user interface, each of the filters having an associated replacement sky type;
   selecting a filter from the plurality of filters, the plurality of filters comprising a sunset mode filter that causes a yellow tone to be added to one or more regions of a given image having a brightness or luminance above a predetermined threshold and causes blue tones to be added to one or more regions of the given image that have a brightness or luminance below the predetermined threshold;
   receiving an image;
   replacing a sky portion of the image based on the replacement sky type associated with the selected filter.

2. The device of claim 1, wherein the operations further comprise:
   when an image is captured by the device after receiving the selection of the filter:
   performing a rough segmentation of the image to generate a first segmented image having ambiguity between a sky portion and non-sky portion of the image;
   performing, using the image captured by the device as a reference, refined segmentation of the first segmented image to generate a second segmented image in which the ambiguity between the sky portion and the non-sky portion of the image has been reduced, the refined segmentation being performed by applying a guided filter to the image and the first segmented image, the guided filter based on a guidance image comprising a grayscale version of the image; and
   identifying the sky portion of the image based on the second segmented image.

3. The device of claim 2, wherein the guided filter is further based on a joint bilateral filter.

4. The device of claim 1, wherein the operations further comprise:
   converting the image to a lab color space; and
   shifting color values in A and B channels of the lab color space away from a center value in each of the A and B channels respectively.

5. The device of claim 1, wherein the operations further comprise retrieving a plurality of color curves each associated with a different color.

6. The device of claim 1, wherein the operations further comprise:
   presenting a plurality of filter selection control indicators simultaneously with a given image presented on a display of the device, each of the plurality of filter selection control indicators being associated with a respective one of the plurality of filters; and
   visually distinguishing one of the filter selection control indicators that corresponds to the one of the plurality of filters selected by received input from a user.

7. The device of claim 6, wherein a first of the plurality of filter selection control indicators textually represents a first of the plurality of filters as a nighttime sky filter, a second of the plurality of filter selection control indicators textually represents a second of the plurality of filters as a daytime sky filter, and a third of the plurality of filter selection control indicators textually represents a third of the plurality of filters as a sunset sky filter.

8. The device of claim 1, wherein the operations further comprise applying a trained classifier to the image, wherein the trained classifier is trained based on training data that includes training images and corresponding annotations that indicate sky portions in the training images and non-sky portions in the training images, wherein the corresponding annotations are received by user input that identifies different portions in each of the training images, the sky portion of the image being identified by identifying similarities between a filter response of the image and filter responses of the sky and non-sky portions of the training images.

9. The device of claim 8, wherein the operations further comprise identifying the sky portion by determining a weight of each pixel of the image after the sky portion is replaced.

10. The device of claim 9, wherein replacing the sky portion comprises:
    determining a weight for a first pixel value in a first location in the sky portion of the image;
    determining a second weight for a second pixel value in the sky data, the second pixel value having a location in the sky data corresponding to the first location; and
    multiplying the first weight by the first pixel value and the second weight by the second pixel value and adding a result of the multiplying to determine a pixel value for the image.

11. The device of claim 1, wherein the plurality of filters comprises a daytime mode filter that causes an overall brightness of the image to be increased and a warm color tone to be added to the image.

12. The device of claim 1, wherein the operations further comprise:
    retrieving a plurality of color curves each associated with a different color;
    modifying a first color of the image based on a first of the plurality of color curves associated with the first color that increases the first color of a first pixel in the image that has a first color value that exceeds a first threshold; and modifying a second color of the image based on a second of the plurality of color curves associated with the second color that decreases the second color of a second pixel in the image that has a second color value that is below a second threshold.

13. The device of claim 1, wherein the plurality of filters comprises a nighttime mode filter that causes an overall brightness of the image to be decreased and a cold color tone to be added to the image.

14. A method, comprising:
providing a plurality of filters in a user interface, each of the filters having an associated replacement sky type;
selecting a filter from the plurality of filters, the plurality of filters comprising a sunset mode, filter that causes a yellow tone to be added to one or more regions of a given image having a brightness or luminance above a predetermined threshold and causes blue tones to be added to one or more regions of the given image that have a brightness or luminance below the predetermined threshold;
receiving an image;
replacing a sky portion of the image based on the replacement sky type associated with the selected filter.

15. The method of claim 14, further comprising:
when an image is captured by a device after receiving the selection of the filter:
performing a rough segmentation of the image to generate a first segmented image having ambiguity between a sky portion and non-sky portion of the image;
performing, using the image captured by the device as a reference, refined segmentation of the first segmented image to generate a second segmented image in which the ambiguity between the sky portion and the non-sky portion of the image has been reduced, the refined segmentation being performed by applying a guided filter to the image and the first segmented image, the guided filter based on a guidance image comprising a grayscale version of the image; and
identifying the sky portion of the image based on the second segmented image.

16. The method of claim 15, wherein the guided filter is further based on a joint bilateral filter.

17. The method of claim 14, further comprising:
converting the image to a lab color space; and
shifting color values in A and B channels of the lab color space away from a center value in each of the A and B channels respectively.

18. The method of claim 14, wherein the plurality of filters comprises a daytime mode filter that causes an overall brightness of the image to be increased and a warm color tone to be added to the image.

19. The method of claim 14, further comprising:
retrieving a plurality of color curves each associated with a different color;
modifying a first color of the image based on a first of the plurality of color curves associated with the first color that increases the first color of a first pixel in the image that has a first color value that exceeds a first threshold; and
modifying a second color of the image based on a second of the plurality of color curves associated with the second color that decreases the second color of a second pixel in the image that has a second color value that is below a second threshold.

20. A non-transitory computer readable medium comprising instructions that when executed cause an electronic hardware processor to perform a method, the method comprising:
providing a plurality of filters in a user interface, each of the filters having an associated replacement sky type;
selecting a filter from the plurality of filters, the plurality of filters comprising a sunset mode filter that causes a yellow tone to be added to one or more regions of a given image having a brightness or luminance above a predetermined threshold and causes blue tones to be added to one or more regions of the given image that have a brightness or luminance below the predetermined threshold;
receiving an image;
replacing a sky portion of the image based on the replacement sky type associated with the selected filter.

* * * * *